(12) United States Patent
Kawahara et al.

(10) Patent No.: US 11,085,501 B2
(45) Date of Patent: Aug. 10, 2021

(54) SUPPORT STRUCTURE FOR DRIVING SOURCE

(71) Applicant: HONDA MOTOR CO., LTD., Tokyo (JP)

(72) Inventors: Kazuya Kawahara, Wako (JP); Hidekazu Kamiyanagita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 112 days.

(21) Appl. No.: 16/381,320

(22) Filed: Apr. 11, 2019

(65) Prior Publication Data
US 2019/0316645 A1    Oct. 17, 2019

(30) Foreign Application Priority Data

Apr. 11, 2018 (JP) .............................. JP2018-076250

(51) Int. Cl.
*F16F 1/38* (2006.01)
*F16F 15/04* (2006.01)
(Continued)

(52) U.S. Cl.
CPC .......... *F16F 1/3849* (2013.01); *F16F 1/3828* (2013.01); *F16F 7/12* (2013.01); *F16F 15/04* (2013.01); *F16F 15/08* (2013.01)

(58) Field of Classification Search
CPC .......... F16F 1/3849; F16F 1/3828; F16F 7/12; F16F 9/00; F16F 1/38; F16F 15/04; F16F 15/08; B60K 5/1208; H02K 5/26
See application file for complete search history.

(56) References Cited

U.S. PATENT DOCUMENTS

| | | | | |
|---|---|---|---|---|
| 5,064,144 A | * | 11/1991 | Chee ..................... | B64D 27/20 244/54 |
| 5,295,671 A | * | 3/1994 | Nakagaki ................ | F16F 13/10 248/638 |

(Continued)

FOREIGN PATENT DOCUMENTS

| | | |
|---|---|---|
| JP | 5-238275 A | 9/1993 |
| JP | 2007-331645 A | 12/2007 |
| JP | 2010-143467 A | 7/2010 |

OTHER PUBLICATIONS

Office Action dated Jun. 10, 2020, issued in counterpart JP Application No. 2018-076250, with English translation (6 pages).
(Continued)

*Primary Examiner* — Tan Le
(74) *Attorney, Agent, or Firm* — Westerman, Hattori, Daniels & Adrian, LLP

(57) ABSTRACT

A vibration isolating mount 17 accommodates an elastic member 20 in the interior of a housing 18 fixed to a vehicle body 16 and a bracket 22 one end of which is fixed to the driving source 11. The other end of the bracket 22 is engaged in a bracket connecting part 21 provided in the elastic member 20. A space β in the longitudinal direction between a rear wall 21*d* of the bracket connecting part 21 and a rear stopper surface 18*e* of the housing 18 is set to be smaller than a space α in the longitudinal direction between the front wall 21*c* of the bracket connecting part 21 and a front stopper surface 18*d* of the housing 18, so that the rearward displacement of the driving source 11 may be effectively suppressed.

5 Claims, 6 Drawing Sheets

(51) Int. Cl.
    *F16F 15/08*     (2006.01)
    *B60K 5/12*     (2006.01)
    *F16F 7/12*     (2006.01)

(56) References Cited

U.S. PATENT DOCUMENTS 6,988,579 B2 * 1/2006 Miyahara .................. F16F 1/38
                                                                       180/299
9,970,507 B2 * 5/2018 Okajima ................... F16F 1/36

OTHER PUBLICATIONS

Office Action dated Nov. 13, 2019, issued in counterpart JP Application No. 2018-076250, with English translation (8 pages).

* cited by examiner

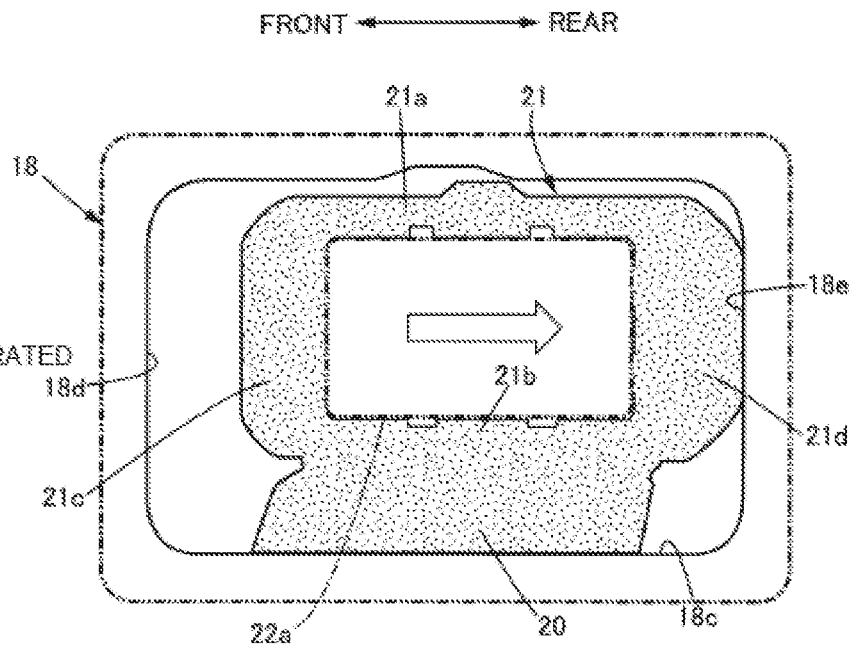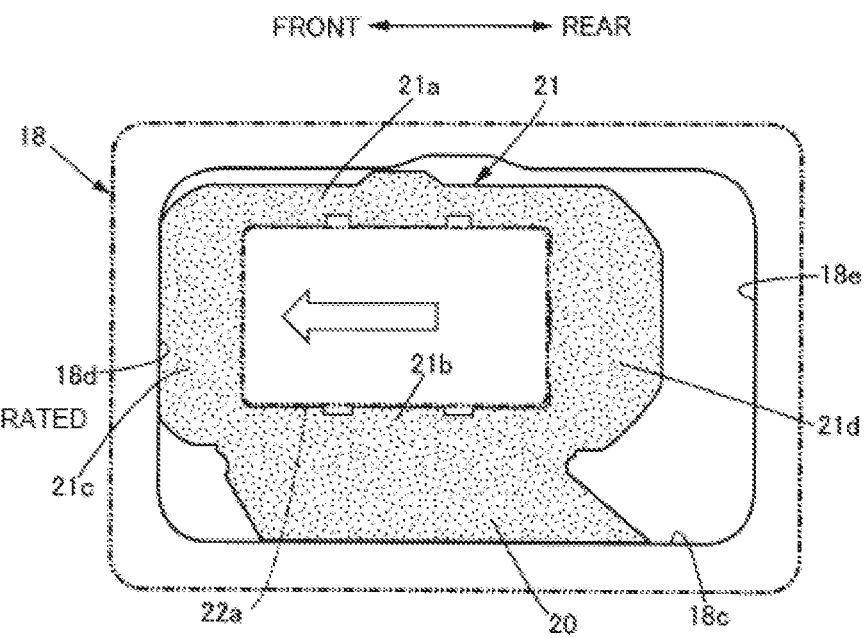

SUPPORT STRUCTURE FOR DRIVING SOURCE

CROSS-REFERENCE OF RELATED APPLICATION

This application claims priority of Japanese Patent Application No. 2018-076250 filed in Japan on Apr. 11, 2018, the entire contents of which are incorporated herein by reference.

TECHNICAL FIELD

The present invention relates to a support structure for a driving source which includes a vibration isolating mount accommodating an elastic member in an interior of a housing fixed on a vehicle body, and a bracket one end of which is fixed on the driving source, wherein the other end of the bracket is engaged in an interior of a bracket connecting part provided in the elastic member.

BACKGROUND OF THE INVENTION

A vibration isolating mount which supports an engine of a vehicle on the vehicle body and which includes an auxiliary vibration isolating member formed in a rectangular box shape by an elastic body such as rubber and the like provided in a vehicle body side mounting member, and an arm-shaped engine side mounting member to be inserted into the auxiliary vibration isolating member is disclosed in Japanese Patent application Laid-Open Publication No. 2007-331645.

By the way, the above mentioned prior art can suppress an excessive displacement of the engine by compressing a front wall or rear wall of the auxiliary vibration isolating member when the engine side mounting member has relatively moved with respect to the vehicle body side mounting member in the longitudinal (a front-to-rear) direction of the vehicle body by inertial force occurred at the time of acceleration or deceleration of the vehicle. Generally, the inertial force occurred by the acceleration at the time of sudden start is larger than the inertial force occurred by the deceleration at the time of braking except sudden deceleration time such as a panic brake. Further, although, in the deceleration time of the vehicle, the engine when it was in idling condition is dropped to the level that a person does not feel its vibration and noise since the brake pedal is pressed after releasing the acceleration pedal, an engine rotational frequency, in the acceleration of the vehicle, is required to be increased by pressing down on the acceleration pedal, and the vibration and noise are increased with increase of the engine rotational frequency. However, in the above mentioned prior art, since the characteristic of the rear wall side of the auxiliary vibration isolating member to be compressed at the time of acceleration is identical with the characteristic of the front wall side of the auxiliary vibration isolating member to be compressed at the time of deceleration, a function of suppressing the excessive displacement of the engine may not be effectively performed.

In order to solve the above mentioned problem, it is conceivable that the rear wall side of the auxiliary vibration isolating member is configured to be larger in thickness than the front wall side thereof.

The reason is that, in the deceleration of the vehicle, the brake pedal is pressed after the acceleration pedal is released so that the engine becomes the idling condition so as to be dropped to the level that a person does not feel its vibration and noise. Therefore, the front wall side of the auxiliary vibration isolating member compressed at the time of deceleration of the vehicle is not required to get larger in thickness. On the other hand, in the acceleration of the vehicle, the rotational frequency of the engine is required to be increased by pressing down on the acceleration pedal, and the vibration and noise are increased with increase of the rotational frequency of the engine. Accordingly, the rear wall side of the auxiliary vibration isolating member compressed at the time of acceleration of the vehicle is required to get larger in thickness.

In view of the above mentioned circumstances, there is a need to provide a vibration isolating mount that can effectively perform a function of suppressing an excessive displacement of a driving source at the time of acceleration and deceleration of a vehicle.

SUMMARY OF INVENTION

In a first embodiment according to the present invention, a support structure for a driving source including a vibration isolating mount which accommodates an elastic member in the interior of a housing fixed to a vehicle body, and a bracket one end of which is fixed to the driving source, wherein the other end of the bracket is engaged in an interior of a bracket connecting part provided in the elastic member, characterized in that a space (gap) in the longitudinal direction between a rear wall of the bracket connecting part and a rear stopper surface of the housing is set to be smaller than a space in the longitudinal direction between the front wall of the bracket connecting part and a front stopper surface of the housing.

In a second embodiment according to the invention, in addition to a configuration of the first embodiment, wherein the bracket connecting part is set such that the thickness in the longitudinal direction of the rear wall is larger than the thickness in the longitudinal direction of the front wall.

In a third embodiment according to the invention, in addition to a configuration of the second embodiment, wherein a cross sectional area of the rear wall of the bracket connecting part is tapered rearward.

In a fourth embodiment according to the invention, in addition to a configuration of any one of the first to third embodiments, further including a mass body mounted on an upper surface of the housing, wherein a front part and a rear part of the mass body are fastened to the housing by a fastening member.

In a fifth embodiment according to the invention, in addition to a configuration of the fourth embodiment, wherein the mass body is provided with a front fastening hole and a rear fastening hole through each of which the fastening member passes, and wherein the mass body is formed with a first recess provided between the front fastening hole and the rear fastening hole so as to form a space across the mass body and thus accessible in the vehicle width direction and a second recess formed by cutting out the circumference of the rear fastening hole in a circular arc shape.

By the way, an engine 11 in an embodiment corresponds to a driving source of the present invention, a right front side frame 16 in the embodiment corresponds to a vehicle body of the present invention, a front bolt hole 28c in the embodiment corresponds to a front fastening hole of the present inventions, a rear bolt hole 28d in the embodiment corresponds to a rear fastening hole of the present invention, and bolts 29, 30 in the embodiment correspond to a fastening member of the present invention.

Effect of the Invention

According to the configuration of the first embodiment, there are provided a vibration isolating mount which accommodates an elastic member in the interior of the housing fixed to the vehicle body, and the bracket one end of which is fixed to the driving source, wherein the other end of the bracket is engaged in a bracket connecting part provided in the elastic member. When the driving source is displaced rearward by the inertial force at the time of acceleration of the vehicle, the rear wall of the bracket connecting part generates the forward reaction force so as to suppress the rearward displacement of the driving source, since the rear wall of the bracket connecting part pressed by the bracket comes into contact with and is flatten by the rear stopper surface of the housing. When the driving source is displaced forward by the inertial force at the time of deceleration of the vehicle, the front wall of the bracket connecting part generates the rearward reaction forces so as to suppress the forward displacement of the driving force, since the front wall of the bracket connecting part pressed by the bracket comes into contact with and is flattened by the front stopper surface of the housing.

Since the space in the longitudinal direction between the rear wall of the bracket connecting part and the rear stopper surface of the housing is set to be smaller than the space in the longitudinal direction between the front wall of the bracket connecting part and the front stopper surface of the housing, the smaller space in the longitudinal direction between the rear wall of the bracket connecting part and the rear stopper surface of the housing is rapidly reduced so that the rear wall of the bracket connecting part immediately generates the forward reaction force so as to be able to effectively suppress the rearward displacement of the driving source, when the driving source is forcibly displaced rearward by the inertial force at the time of sudden acceleration of the vehicle. In addition, the rear wall of the bracket connecting part comes into rapid contact with the rear stopper surface thereby to transmit load so that the vibration and noise by the increase of the rotational frequency of the engine at the time of acceleration can be suppressed, when the driving source is forcibly displaced rearward by the inertial force at the time of sudden acceleration of the vehicle.

According to the configuration of the second embodiment, since the bracket connecting part is set such that the thickness in the longitudinal direction of the rear wall is larger than the thickness in the longitudinal direction of the front wall, the rear wall which is larger in thickness comes into contact with the rear stopper surface so as to gradually increase the reaction force load which the rear wall generates thereby to reduce an impact of contact so that uncomfortable feeling of the occupant can be solved, when the driving source is forcibly displaced rearward by the sudden acceleration of the vehicle.

According to the configuration of the third embodiment, since the cross sectional area of the rear wall of the bracket connecting part is tapered rearward, the rear wall is flattened and the generated reaction force load is increased slowly without rapid increase when the driving source has been displaced rearward and the rear wall of the bracket connecting part has made contact with the rear stopper surface of the housing, so that the impact of contact can be more effectively decreased thereby to more effectively solve the uncomfortable feeling of the occupant.

According to the configuration of the fourth embodiment, since the mass body is mounted on the upper surface of the housing, and since the front part and the rear part of the mass body are fastened to the housing by the fastening member, a resonance frequency of the vibration isolating mount is shifted by the mass body and the vibration isolating mount resonates so that vibration and noise characteristics can be prevented from deterioration.

Further, according to the configuration of the fifth embodiment, since the mass body is provided with the front fastening hole and the rear fastening hole through each of which the fastening member passes, and since the mass body is formed with the first recess provided between the front fastening hole and the rear fastening hole in the vehicle width direction and the second recess formed by cutting out the circumference of the rear fastening hole in a circular shape, a tool can be operated by passing through the first recess, and other members can be prevented by the second recess from interfering with the mass body.

BRIEF DESCRIPTION OF THE DRAWINGS

FIG. 5A is an operation explanation view corresponding to FIG. 3 when accelerated;

FIG. 5B is an operation explanation view corresponding to FIG. 3 when decelerated.

DETAILED DESCRIPTION OF EMBODIMENTS OF THE INVENTION

Hereinafter, an embodiment of the present invention will be explained with reference to FIGS. 1 to 6. By the way, the longitudinal (front-to-rear) direction, the horizontal direction (the vehicle width direction), and the vertical direction in the specification are to be defined based on a vehicle body.

Figure 1:
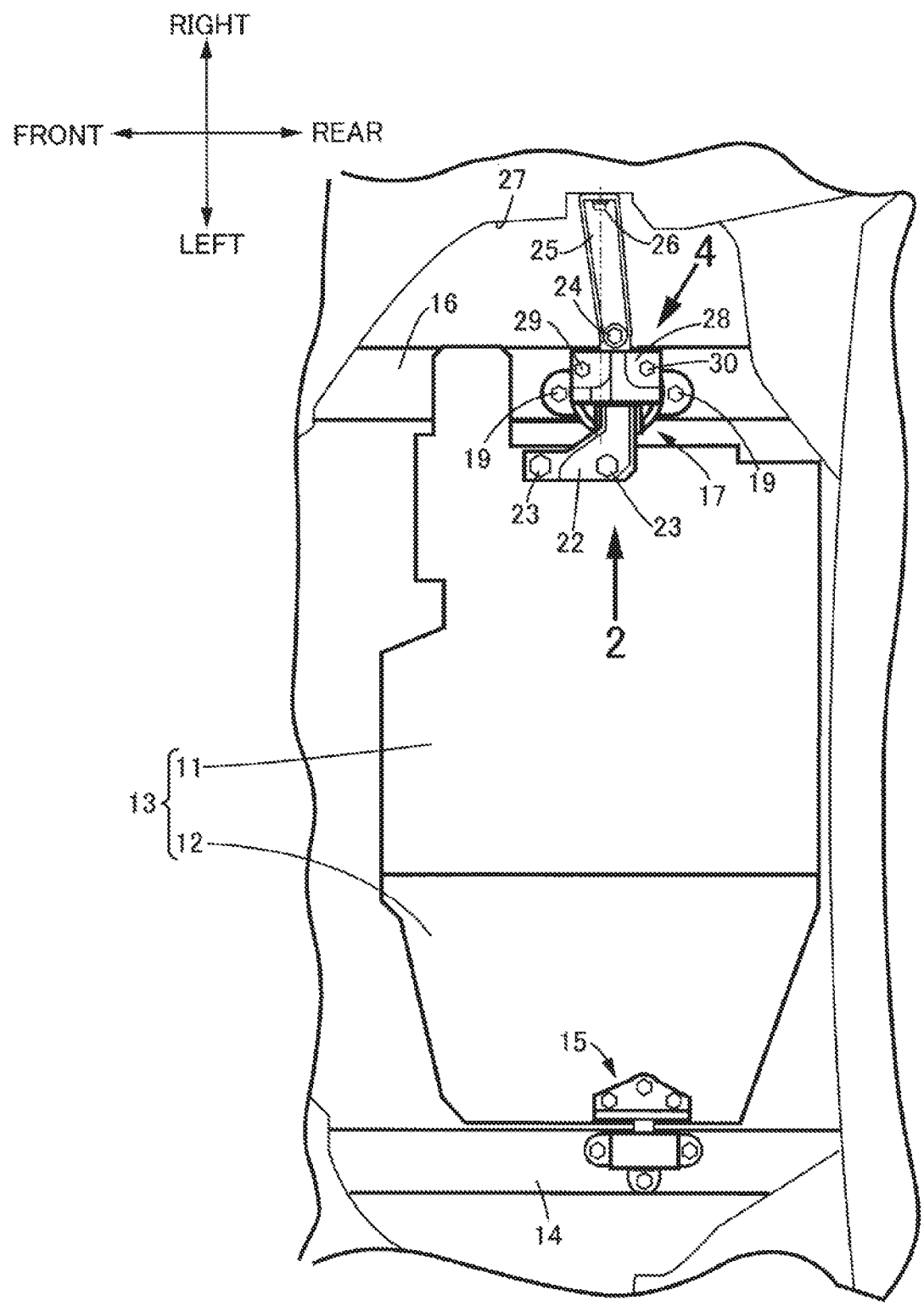
FIG. 1 is a view of an engine room of a motor car when viewed from above.

FIG. 1 is a view of an engine room of a motor car when viewed from above, wherein a power train 13 integrally combining an engine 11 and a transmission 12 is mounted in a horizontally directed attitude in which a crankshaft of the engine 11 is arranged in the vehicle width direction. A left lateral part of the transmission 12 is elastically supported through a vibration isolating mount 15 on a left front side frame 14, and a right lateral part of the engine 11 is elastically supported through a vibration isolating mount 17 on a right front side frame 16.

Figure 2:
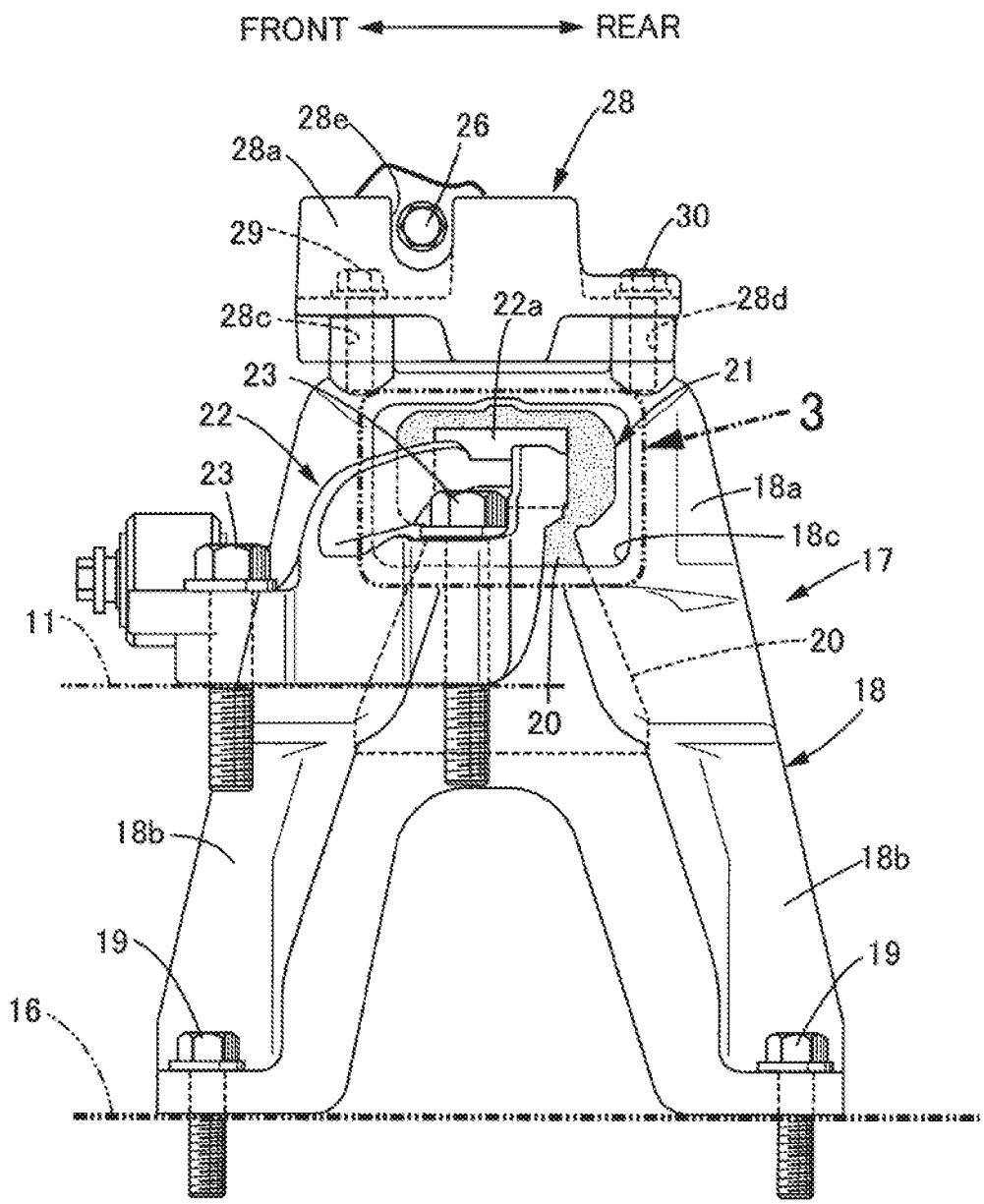
FIG. 2 is an enlarged view in the direction shown by an arrow 2 of FIG. 1.

As shown in FIG. 2, the vibration isolating mount 17 which supports the engine 11 has a housing 18 formed in a portal shape. The housing 18 is formed with a hollow elastic member accommodating part 18a and a pair of front and rear leg parts 18b, 18b extending downward from the elastic member accommodating part 18a. Each of leg parts 18b, 18b is fixed on an upper surface of the right front side frame 16 by two bolts 19, 19. An elastic member 20 made of rubber or the like is accommodated in an interior of the elastic member accommodating part 18a. A lower part of the elastic member 20 is fixed on a bottom part of the elastic member accommodating part 18a, and a bracket connecting part 21 is integrally provided on an upper part of the elastic member 20 which is a free end.

Figure 3:
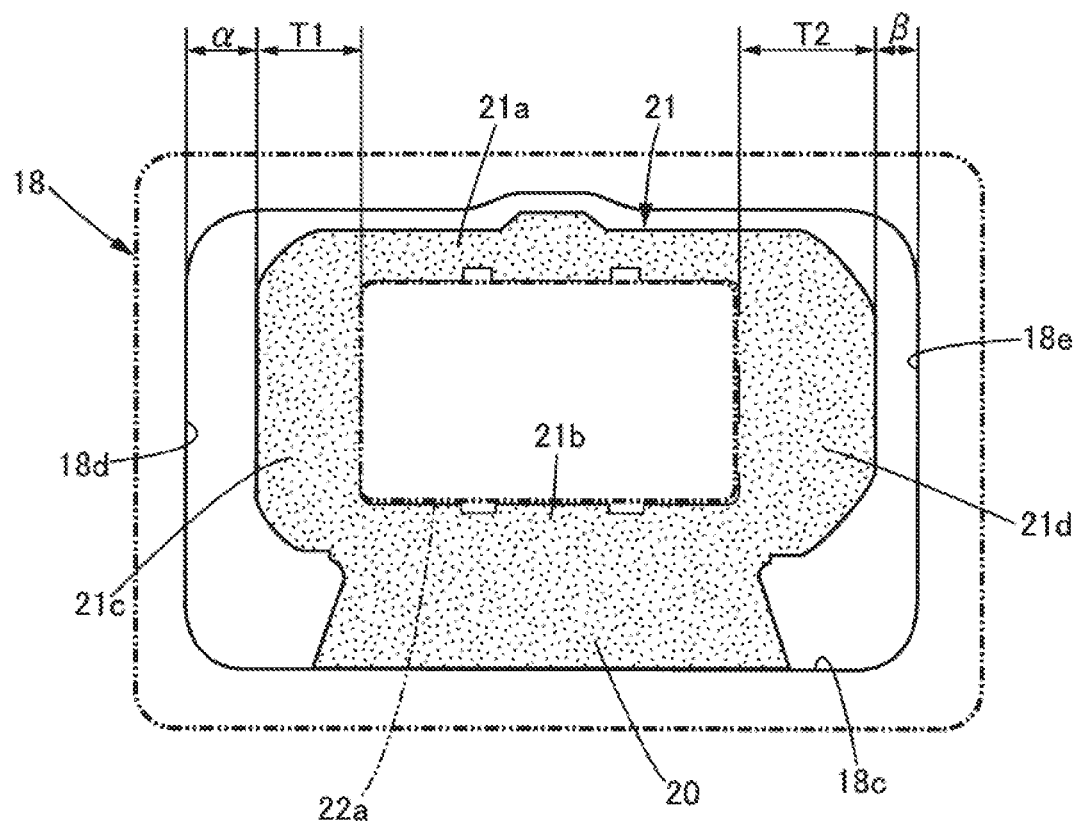
FIG. 3 is an enlarged view of a part shown by an arrow 3 of FIG. 2.

As shown in FIGS. 2 and 3, the bracket connecting part 21 of the elastic member 20 has an upper wall 21a, a lower wall 21b, a front wall 21c and a rear wall 21d and is formed in a square frame shape. A square shaped opening part 18c is formed in the elastic member accommodating part 18a of the housing 18 facing a left side of the bracket connecting part. The front wall 21c of the bracket connecting part 21 is formed in such a taper shape that a cross sectional area thereof decreases forward. A space (gap) a in the longitudinal direction is formed between a front surface of bracket connecting part 21 and a stopper surface 18d of the elastic member accommodating part 18a of the housing 18. Moreover, the rear wall 21d of the bracket connecting part 21 is formed in such a taper shape that a cross sectional area thereof decreases rearward. A space (gap) β in the longitudinal direction is formed between a rear surface of the bracket connecting part 21 and a rear stopper surface 18e of the elastic member accommodating part 18a of the housing 18.

A thickness T2 in the longitudinal direction of the rear wall 21d of the bracket connecting part 21 is set to be larger than a thickness T1 in the longitudinal direction of the front wall 21c of the bracket connecting part 21, while the space β in the longitudinal direction on the rear side is set to be smaller than the space α in the longitudinal direction on the front side.

A bracket 22 is fixed on an upper surface of the engine 11 by two bolts 23, 23. A tip of an arm part 22a of a square cross section extending outward in the vehicle width direction passes through the opening part 18c of the housing 18 and is engaged with the bracket connecting part 21.

Figure 4:
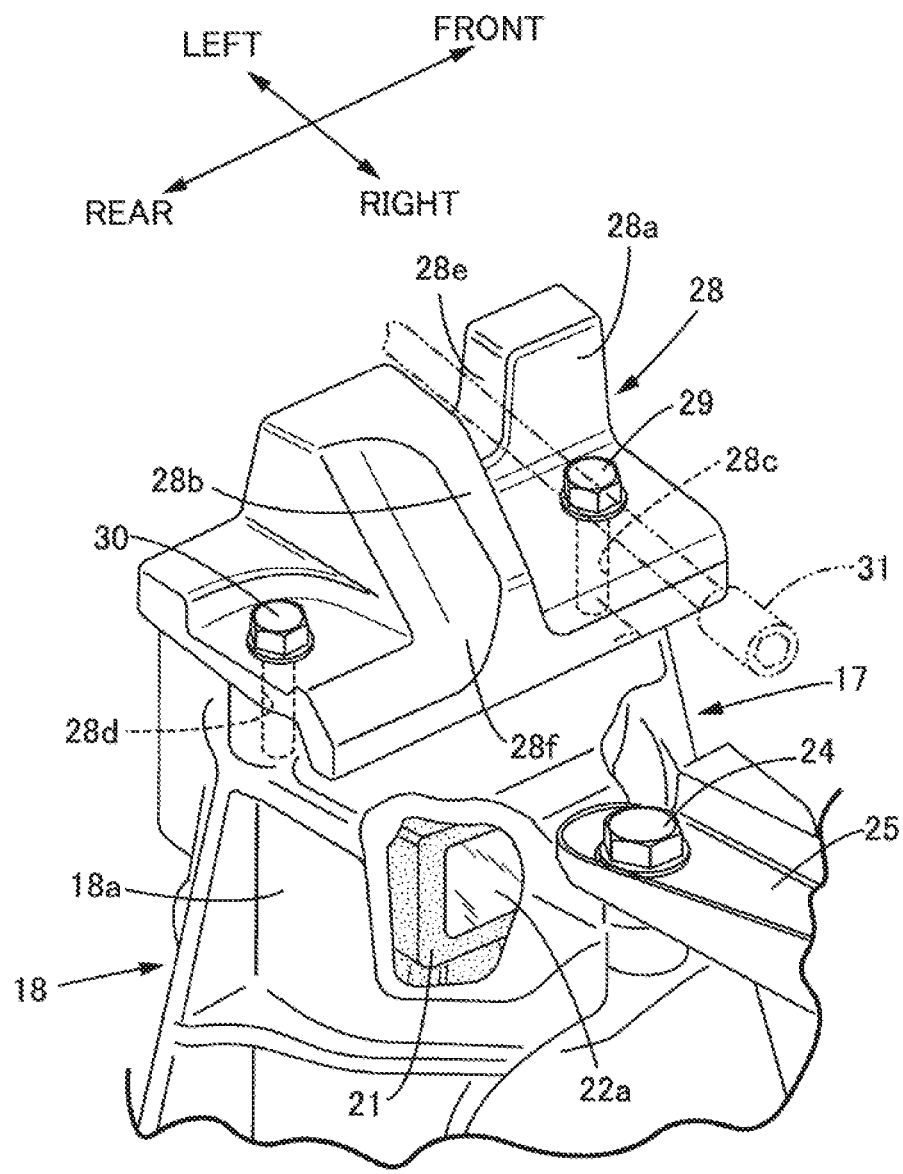
FIG. 4 is an enlarge perspective view in the direction shown by an arrow 4 of FIG. 1.

As shown in FIGS. 1 and 4, an inner end in the vehicle width direction of a stay 25 is fastened to an upper part of housing 18 by a bolt 24, and an outer end in the vehicle width direction of the stay 25 is fastened to a right lateral wall 27 of an engine room by a bolt 26. The stay 25 provides a connection between the housing 18 and the lateral wall 27 of the engine room and has a function of enhancing the supporting rigidity of the vibration isolating mount 17 with respect to the right front side frame 16.

As shown in FIG. 4, a mass body 28 is fastened to the upper surface of the housing 18 by two bolts 29, 30. The mass body 28 is provided with a vertical wall part 28a extending in the longitudinal direction along the left lateral surface thereof and a horizontal wall part 28b extending from a rear portion of the vertical wall part 28a to the right direction. A front bolt hole 28c through which a front bolt 29 passes is formed in front of the horizontal wall part 28b, and a rear bolt hole 28d through which a rear bolt 30 passes is formed in the rear of the horizontal wall part 28b.

A first recess 28e which traverses the vertical wall part 28a and communicates with both sides in the vehicle width direction is formed on the vertical wall part located in front of the horizontal wall part 28b so as to form a space or path across the mass body 28, and a second recess 28f which cuts out a rear surface of the horizontal wall part 28b in a circular arc shape is formed on the rear surface of the horizontal wall part.

Next, the operation or effect of the embodiment of the present invention provided with the above mentioned configuration will be explained.

When operating the engine 11 of the power train 13, the vibration of the engine 11 is transmitted through the vibration isolating mount 17 to the vehicle body. In other words, the vibration transmitted from the engine 11 to the bracket 22 is transmitted through the bracket connecting part 21 of the vibration isolating mount 17, the elastic member 20 and the housing 18 to the right front side frame 16 and transmitted from the housing 18 through the stay 25 to the lateral wall 27 of the engine room. However, the elastic member 20 and the bracket connecting part 21 each made of rubber absorb the vibration so that the vibration transmitted to the vehicle body can be reduced.

Then, the power train 13 in which the crankshaft of the engine 11 is mounted in a horizontally placed manner along the vehicle width direction is about to be displaced in the longitudinal direction by the inertial force when the vehicle is accelerated or decelerated, since both left and right sides of the power train 13 are supported by the vibration isolating mounts 15, 17. In other words, when the vehicle is accelerated, the power train 13 which tries to stay in its original position by the inertial force is displaced rearward with respect to the vehicle body, while, when the vehicle is decelerated, the power train 13 which tries to stay in its original position by the inertial force is about to be displaced forward with respect to the vehicle body. In order that the vibration of the engine 11 is hard to be transmitted to the vehicle body, it is desirable that the elastic member 20 of the vibration isolating mount 17 is set to be soft. However, when doing so, there is a problem that the power train 13 is displaced large in the longitudinal direction at the time of acceleration or deceleration of the vehicle.

As shown in FIG. 5(A), when the power train 13 is displaced rearward with respect to the vehicle body by accelerating the vehicle, the bracket 22 fixed on the engine 11 relatively moves rearward with respect to the housing 18 fixed on the vehicle body so that the arm part 22a of the bracket 22 presses the bracket connecting part 21 of the elastic member 20 in the rearward. As a result, the bracket connecting part 21 moves rearward and the rear wall 21d comes into contact with the rear stopper surface 18e of the housing 18, so that the power train 13 can be prevented from the excessive displacement in the rearward direction. At that time, since the rear wall 21d of the bracket connecting part 21 which makes contact with the rear stopper surface 18e of the housing 18 is flattened so as to be elastically deformed, so that the impact by the contact of the rear wall 21d and the rear stopper surface 18e may be absorbed.

As shown in FIG. 5(B), when the power train 13 is displaced forward with respect to the vehicle body by decelerating the vehicle, the bracket 22 fixed on the engine 11 relatively moves forward with respect to the housing 18 fixed on the vehicle body, so that the arm part 22a of the bracket 22 presses the bracket connecting part 21 of the elastic member 20 in the forward direction. As a result, the bracket connecting part 21 moves forward and the front wall 21c comes into contact with the front stopper surface 18d of the housing 18, so that the power train 13 can be prevented from the excessive displacement in the forward direction. At that time, since the front wall 21c of the bracket connecting part 21 which makes contact with the front stopper surface 18d of the housing 18 is flattened so as to be elastically deformed, so that the impact by contact of the front wall 21c and the front stopper surface 18d may be absorbed.

Particularly, the inertial force in the case of being suddenly accelerated by pressing down on the accelerator pedal all at once is larger than the inertial force at the time of deceleration by the normal braking. Therefore, in this embodiment, the thickness T2 of the rear wall 21*d* of the bracket connecting part 21 is set to be larger than the thickness T1 of the front wall 21*c*, and the space β between the rear wall 21*d* and the rear stopper surface 18*e* is set to be smaller than the space α between the front wall 21*c* and the front stopper surface 18*d*.

As a result, when the power train 13 is displaced rearward vigorously by the large inertial force accompanying the acceleration of the vehicle, the excessive rearward movement of the power train 13 is assuredly prevented by rapidly reducing the small space β. In addition, since the rear wall 21*d* having the large thickness T2 is elastically deformed, the impact by the contact of the rear wall 21*d* and the rear stopper surface 18*e* is absorbed, so that the uncomfortable feeling of the occupant may be solved and the vibration and noise by the increase of the engine rotational frequency at the time of acceleration of the vehicle may be effectively suppressed.

At that time, since the rear wall 21*d* of the bracket connecting par 21 decreases its cross sectional area in the rearward direction, the reaction force generated when the rear wall 21*d* and the rear stopper surface 18*e* come into contact and are flattened is gradually increased without abrupt increase so that the impact by contact may be more effectively absorbed so as to more effectively solve the uncomfortable feeling of the occupant.

Figure 6:
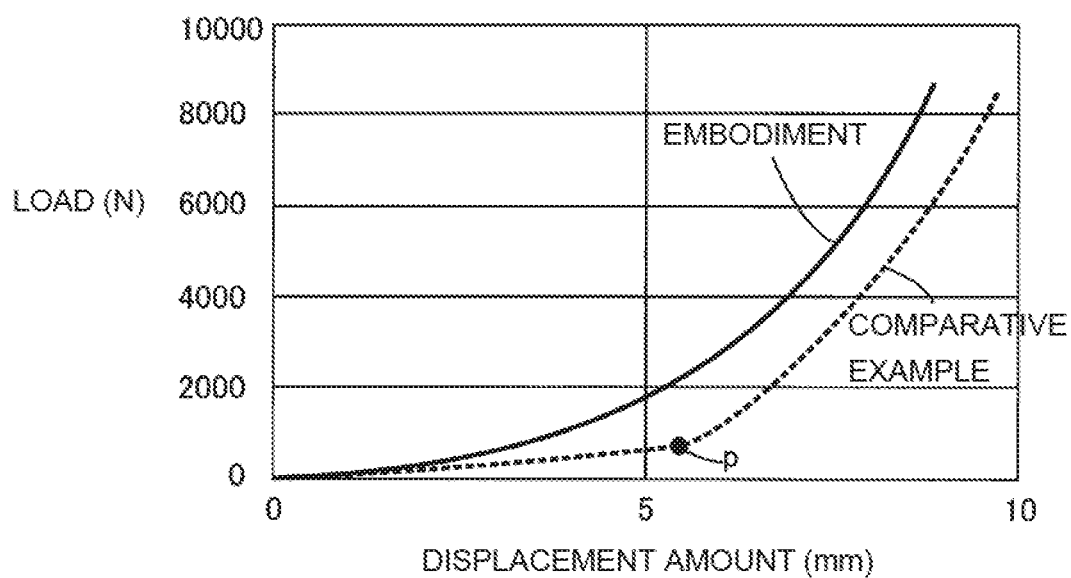
FIG. 6 is a graph showing a relationship between a displacement amount of a bracket and load of a bracket connecting part.

In a graph of FIG. 6, a broken line corresponds to a comparative example in which the space between the bracket and each of the front wall and the rear wall of the bracket connecting part is identical. When the vehicle is accelerated with a wide open throttle and the bracket comes into contact with the bracket connecting part (see a point p), the load generated by the bracket connecting part before and after that time is suddenly changed, so that the problem is that the occupant feels the vibration suddenly having increased. On the other hand, a solid line corresponds to the embodiment that the space between the bracket 22 and the rear wall 21*d* of the bracket connecting part 21 is small. The bracket 22 comes into contact with the rear wall 21*d* from the initial stage of the wide open throttle so as to generate the load, and thereafter, the load is gradually increased in accordance with the increase of the displacement amount of the rear wall 21*d*, whereby it can be avoided that the uncomfortable feeling is given to the occupant.

Further, when the vibration of the engine 11 is transmitted through the vibration isolating mount 17 to the vehicle body, the problem is that the characteristics of the vibration and noise of the vehicle are deteriorated when the vibration isolating mount 17 resonates. However, since the mass body 28 is mounted on the upper surface of the housing 18 of the vibration isolating mount 17 by the bolts 29, 30, the resonance frequency of the vibration isolating mount 17 is shifted from the frequency of the normal usage operation region of the engine 11, so that the characteristics of the vibration and noise may be prevented from deterioration.

In the case where the mass body 28 is mounted on the upper surface of the housing 18 of the vibration isolating mount 17, there is a problem that the insertion of a tool 31 such as a socket wrench is obstructed so as to deteriorate workability when the bolt 26 which fastens the end of the stay 25 to the lateral wall 27 of the engine room is attached and detached. However, according to this embodiment, as shown in FIG. 4, the tool 31 is inserted by passing through the first recess 28*e* provided in the mass body 28, so that the attaching and detaching work of the bolt 26 can be performed without hindrance.

Further, since the second recess 28*f* is provided in the upper part of the mass body 28, it can be avoided that other member arranged in the engine room interferes with the mass body 28 even if the other member is disposed close to the mass body 28.

Although the embodiment of the present invention has been described in its preferred form, various changes and modifications may be made in the invention without departing from the spirit and scope thereof.

For example, the driving source of the present invention is not limited to the engine 11 of the embodiment and may be other kind of driving source such as an electric motor and the like.

Further, the vehicle body of the present invention is not limited to the right frond side frame 16 of the embodiment.

The invention claimed is:

1. A support structure which supports a driving source, comprising:
   a bracket one end of which is fixed to a driving source; and
   a vibration isolating mount comprising:
      a housing fixed to a vehicle body and having an interior space which has a rear stopper surface and a front stopper surface; and
      an elastic member housed in the interior space of the housing and having a bracket connecting part to which another end of the bracket is connected, the bracket connecting part having a rear wall which faces the rear stopper surface of the housing and a front wall which faces the front stopper surface of the housing,
      wherein a gap formed in the front-to-rear direction between the rear wall of the bracket connecting part and the rear stopper surface of the housing is set to be smaller than a gap formed in the front-to-rear direction between the front wall of the bracket connecting part and the front stopper surface of the housing.

2. The support structure according to claim 1, wherein a thickness in the front-to-rear direction of the rear wall is larger than a thickness in the front-to-rear direction of the front wall.

3. The support structure according to claim 2, wherein a cross sectional area of the rear wall of the bracket connecting part is tapered rearward.

4. The support structure according to claim 1, further comprising a mass body mounted on an upper surface of the housing,
   wherein a front part and a rear part of the mass body are fastened to the housing by a fastening member.

5. The support structure according to claim 4,
   wherein the mass body is provided with a front fastening hole and a rear fastening hole through each of which the fastening member passes, and
   wherein the mass body has a first recess formed between the front fastening hole and the rear fastening hole such that the mass body has an accessible space opened in a vehicle width direction and a second recess formed by cutting out a circumference of the rear fastening hole in a circular arc shape.

* * * * *